(12) United States Patent
Chen et al.

(10) Patent No.: US 8,320,425 B1
(45) Date of Patent: Nov. 27, 2012

(54) PUMP CAVITIES FOR DIODE LASER ARRAY PUMPED LASER RODS

(75) Inventors: Ying Chen, Orlando, FL (US); Michael Bass, Indian River Shores, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 49 days.

(21) Appl. No.: 12/893,076

(22) Filed: Sep. 29, 2010

Related U.S. Application Data

(60) Provisional application No. 61/263,645, filed on Nov. 23, 2009.

(51) Int. Cl.
*H01S 3/091* (2006.01)
*H01S 3/09* (2006.01)
*H01S 3/08* (2006.01)

(52) U.S. Cl. ................ 372/75; 372/69; 372/92

(58) Field of Classification Search .............. 372/69–70, 372/72, 75, 92–99
See application file for complete search history.

(56) References Cited

U.S. PATENT DOCUMENTS

| 6,009,110 A * | 12/1999 | Wiechmann et al. ........... 372/10 |
| 6,075,803 A * | 6/2000 | Bull et al. ........................ 372/75 |
| 2002/0027937 A1 * | 3/2002 | Govorkov et al. .............. 372/75 |

* cited by examiner

*Primary Examiner* — Jessica Stultz
*Assistant Examiner* — Phillip Nguyen
(74) *Attorney, Agent, or Firm* — Brian S. Steinberger; Phyllis K. Wood; Law Offices of Brian S. Steinberger, P.A.

(57) ABSTRACT

Systems, apparatus, devices and methods for pumping rod shaped solid state lasers with interchangeable arrays of diode laser pump sources that allows for rapid change of the diode laser array pump source without affecting or altering the solid state laser resonator. An embodiment includes a roof top structure having a light scattering reflection roof-top portion, sides with an interior specular reflecting surface and base opposite the top portion. The cavity includes a laser rod within the top portion of the structure positioned between opposing side walls, laser rod optics, and a pump source connected with the base plate to pump the laser rod. The pump cavity can include a mechanism for automating the rapid interchangeability of the pump source.

28 Claims, 4 Drawing Sheets

PUMP CAVITIES FOR DIODE LASER ARRAY PUMPED LASER RODS

This application claims the benefit of priority to U.S. Provisional Application No. 61/263,645 filed on Nov. 23, 2009.

FIELD OF THE INVENTION

This invention relates to lasers, in particular to systems, devices and methods for pumping rod shaped solid state lasers with high efficiency and uniformity with arrays of interchangeable diode laser pump sources that allows for rapid change of the diode laser array pump source without affecting or altering the solid state laser resonator, and for systems, devices and methods for a pump cavity for diode laser pumping rod shaped solid state lasers, the pump cavity employing a mixture of specular and scattering surfaces to achieve both efficient and uniform pumping.

BACKGROUND AND PRIOR ART

The present invention derives from the question of how to use commonly available arrays of diode lasers to pump simple rod shaped solid state lasers. In 2001-2002 the co-inventors developed and demonstrated pump cavities that would enable diode arrays to pump laser rods. The diode arrays are formed by stacking several diode laser bars, each typically 1 cm wide, with appropriate spacers. The emitting part of the array then covers a rectangular area which is seemingly incompatible with efficiently pumping a rod shaped solid state laser. In the experiments, changing pump arrays requires substantial time and re-alignment of the laser resonator particularly if donut arrays of diode pump lasers are used.

The co-inventors Ying Chen and Michael Bass later investigated pump cavities for diode laser array pumped laser rods including a new configuration of pump cavity for diode laser pumping solid state rod shaped lasers. Pump cavities are used to collect light from a pump source and deliver it to a gain medium where it can be absorbed and excite the medium to lase. Diode lasers are excellent pump sources but the light diverges and is hard to get into the gain medium. Rod shaped solid state laser media are very convenient to manufacture and to seal for cooling. Arrays of diode lasers are commercially available. The inventors developed a pump cavity with a house shaped cross section called a roof top cavity that is convenient to produce, compatible with commercially available diode laser arrays.

The work performed by the co-inventors included the concept of the "D" and "roof-top" laser pump cavities. It is worth noting that in his book, "Solid State Laser Engineering", Walter Koechner describes face pumping slab lasers with flashlamps in pump cavities that reverse the co-inventors concepts. The lamp is placed on the axis of the "D" or the "roof-top" (Koechner calls this a "V" pump cavity) and the slab is placed in the base plane. In the configuration developed by the co-inventors, the gain medium was placed where Koechner has the flashlamp and an approximately planar array of pump light was placed in the base plane where Koechner has the gain medium enabling pumping rod shaped lasers with diode arrays. Tests were conducted with this configuration.

FIGS. 1a and 1b show a "D" 100 and a "V" 150 cavity, respectively, including cross sections and dimensions. The diode bars 120 and 170 were oriented in the base plane parallel to the length of the gain medium. For the D-type cavity there are two rod positions 110 and 115 considered during the testing in the "D" cavity 100 as shown in FIG. 1. One rod 115 is along the axis of the cylindrical section and places the rod 115 axis 13 mm from the plane of the diode array 120. This example is referred to as the case of a centered rod. The other rod 110 position is called off centered and locates the rod 115 center 16 mm from the plane of the diode array 120. For the V-type cavity 150 there is one position shown for the rod 160 which is placed 14 mm from the plane of the diode array 170.

Four kinds of surfaces or materials were used in both "D" and "V" cavities for the experiments. These are Spectralon, and metal surfaces we call S1, S2, and S3. The S1 surface is the one with fine size EDM finishing, S2 has coarse size EDM finishing and S3 is as finished in the milling machining. All three metal surfaces were gold plated. Using the Cary 500 reflectance measurement capability it was found that the S1 and S2 surfaces reflect about 96% while the Spectralon reflects about 98%. The S3 surface was not measured since it presented both diffusive and specular reflection.

Using an experimental setup, the pattern of fluorescence, which is indicative of the distribution of the absorbed pump power, was observed. The fluorescence pattern for each "D" or "V" pump cavity was measured. Both the "D" and "V" pump cavities led to respectable lasing but the efficiency achieved was not what had been expected. To achieve higher efficiency the co-inventors determined that they must eliminate any gaps between the diode array and the pump cavity walls that were present in these experiments and that further research was required to understand the properties of the pump cavity walls as they reflect, scatter or absorb pump light. It became clear that no matter where you placed the rod or how you finished the inner walls of either type of cavity, the rod's absorption of pump light would not be both efficient and uniform.

Thus, the need exists for solutions to the above problems with the prior art. The co-inventors have developed a pump cavity with a house shaped cross section called a roof top cavity that is convenient to produce, compatible with commercially available diode laser arrays, and resulted in efficient pump light absorption with good uniformity.

SUMMARY OF THE INVENTION

A primary objective of the present invention is to provide systems, methods, devices and apparatus where simplicity, rapid change of pump source, automated change of pump source, and enabling efficient solid state laser operation is achieved over a wide range of operating temperatures A secondary objective of the present invention is to provide systems, apparatus, devices and methods for pumping rod shaped solid state lasers with arrays of diode laser pump sources that allows for rapid change of the diode laser array pump source without affecting or altering the solid state laser resonator, A third objective of the present invention is to provide and for systems, apparatus, devices and methods for automating rapid change of the diode laser array pump source without affecting or altering the solid state laser resonator for field applications.

A fourth objective of the present invention is to provide for systems, apparatus, devices and methods of enabling diode pumped solid state lasers to work in any environment by easily changing the diode laser array pump source without affecting the solid state laser resonator.

A fifth objective of the present invention is to provide for systems, apparatus, devices and methods for a simple pump cavity for diode laser pumping rod shaped solid state lasers, the pump cavity employing a mixture of specular and scattering surfaces to achieve both efficient and uniform pumping.

A sixth objective of the present invention is to provide for systems, apparatus, devices and methods for simple, inexpensive cavity for diode pumped solid state lasers operating over a very wide range of output powers from single watts to hundreds of watts of output.

A seventh objective of the present invention is to provide for systems, apparatus, devices and methods for a pump cavity that can replace many currently marketed complex diode pumped laser designs at much lower price and with much more convenient configurations.

A first embodiment of the present invention provides a method of rapidly changing a pump source in a laser system that includes providing a roof top pump cavity having a diffused reflector interior roof top, specular reflective side plates and a base plate opposite the roof top, positioning a laser rod between the specular reflective side plates within the roof top of the pump cavity, providing a laser resonator output coupler for the laser rod and a laser resonator reflector for the laser rod and pumping the laser rod with a first set of pump diode laser arrays with a wavelength spectrum optimized for pumping at one operating temperature. The first set of pump diode laser arrays are removably connected with the roof top pump cavity to allow removal without touching laser resonator components. The base plate can be a window to couple pump light into the pump cavity while allowing the pump cavity to be sealed to confine coolant within the pump cavity for the laser rod.

The first pump diode laser array can be replaced with a second pump diode laser array having a wavelength spectrum optimized for a second operating temperature different than the first operating temperature by rotating, sliding or snapping a third pump diode laser array from a turret, a slidable plate or removable plate containing two or more different pump diode laser array into position to replace the first pump diode laser array.

A second embodiment of the present invention provides a laser pump cavity that includes a roof top structure with a roof-top portion with an interior light scattering reflector surface and specular reflector side walls with a base opposite the roof-top portion, a laser rod positioned within the roof-top portion of the roof top structure between the specular reflector side walls and a pump source removably connected with the base to pump the laser rod. The roof-top portion can be D-shaped and the laser rod is positioned at the focal point of the D curve. The base plate can be mounting structure such as a slidable or rotatable base plate containing two or more pump sources to position any one of the two or more pump sources to pump the laser rod while storing the other two or more pump sources. Alternatively the pump source can be screwed or snapped into position to pump the laser rod.

The cavity can include one or more of a Q-switch, a polarizer, an intracavity lens, a mode locking modulator, a second harmonic generator, and an alignment wedge, a laser resonator output coupler on one side of the roof top structure and a laser resonator reflector opposite the laser resonator output for the laser rod and can include a sensor coupled with the laser pump cavity to sense an environmental condition and a controller to change a position of the movable mounting structure to automatically change the pump source based on the sensed environmental condition.

A third embodiment provides an interchangeable laser pump source system that includes a roof top structure having a top portion and side walls extending from the top portion to form the roof top structure with an open end opposite the top portion, a laser rod positioned within the top portion of the roof top structure between the side walls, a movable base plate opposite the top portion of the roof top structure, and two or more pump sources connected with the movable base plate and coupled to pump the laser rod, the base plate movable to allow changing of the pump source without touching other laser resonator components. The system can include a sensor coupled with the laser pump cavity to sense an environmental condition and a controller to change a position of the movable mounting structure to automatically change the pump source based on the sensed environmental condition.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

| | |
|---|---|
| 100 | D-shaped cavity |
| 110 | rod placement |
| 115 | rod placement |
| 120 | diode bars |
| 150 | V-shaped cavity |
| 160 | rod placement |
| 170 | diode bars |
| 210 | roof top cavity |
| 220 | laser rod |
| 230 | array of pump diode bars |
| 240 | resonator reflector |
| 250 | resonator output coupler |
| 300 | D-type roof top cavity structure |
| 310 | Straight side walls |
| 315 | curved surface |
| 320 | laser rod |
| 325 | focal point of curve |
| 330 | array of pump diode bars |

The subject inventor has demonstrated in the lab at CREOL, The College of Optics & Photonics, at the University of Central Florida that pump cavities that had been proposed many years ago could be adapted to this problem. Such pump cavities were designed to deliver flash lamp light from linear flash lamps to laser rods. The subject co-inventor determined that some of these pump cavities had places where the flash lamp light would be made nearly parallel by the form of the pump cavity. They then reasoned that if the rectangular array of diode lasers were placed at the base plane and the laser rod were placed where the flashlamp had been, then the light from the array would be efficiently delivered to the rod.

At the time when these cavities were studied, it was not realize that these cavities provided a great advantage in the field of diode pumped solid state lasers. That advantage is that the diode array can be removed and replaced without affecting the alignment of the solid state laser resonator. This feature means that lasers employing such cavities can be designed for easy and rapid replacement of a diode array pump source.

Figure 1B:
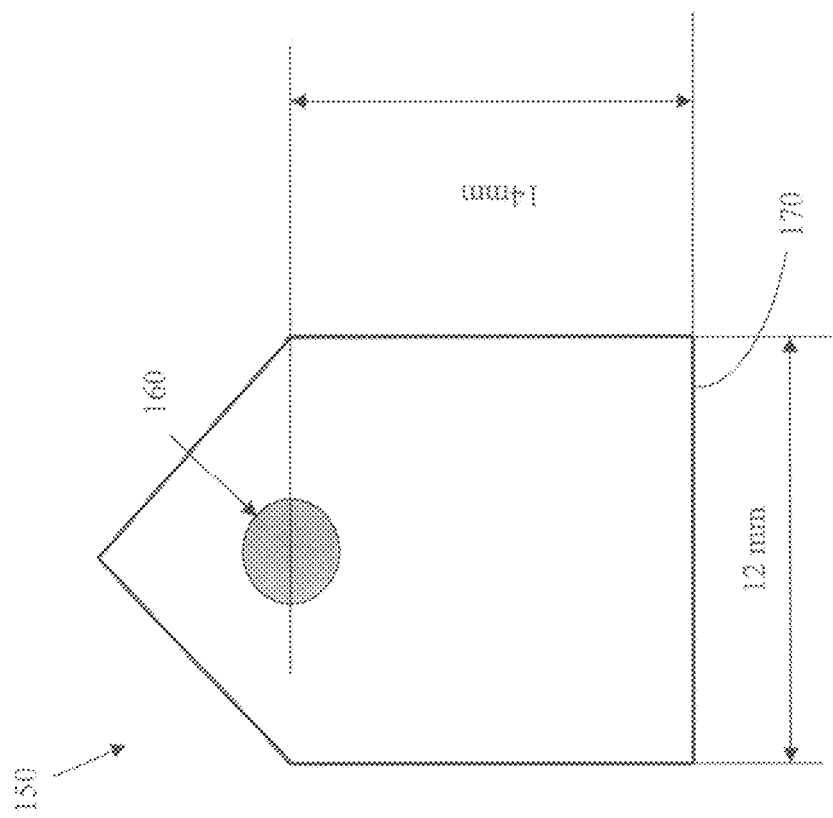
FIG. 1b shows an example of a "V"-shaped laser pump cavity.
Figure 1A:
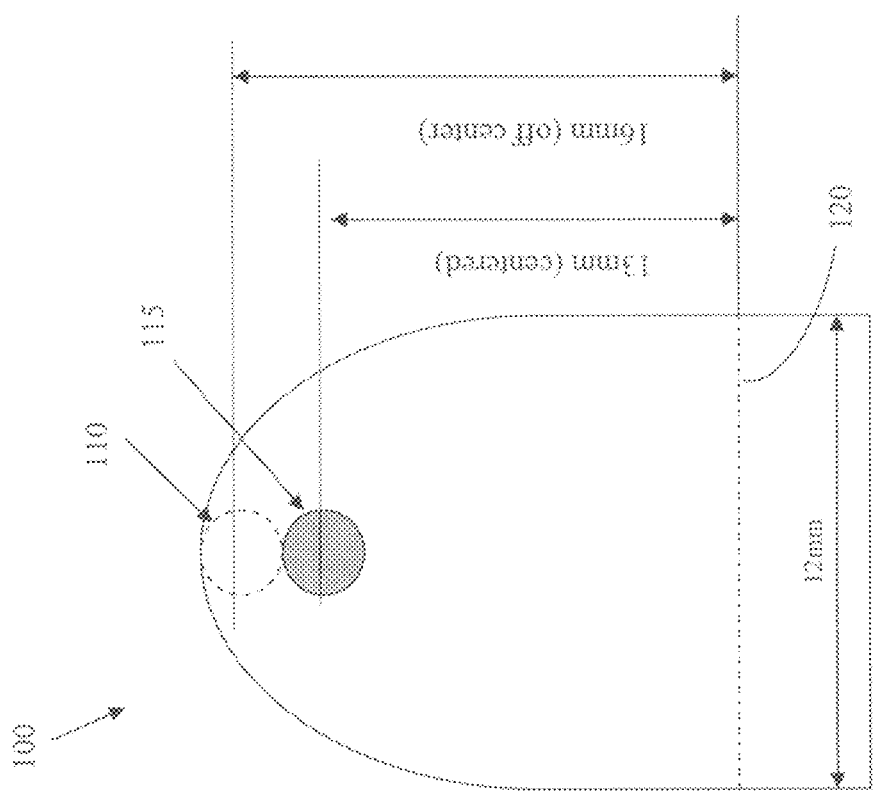
FIG. 1a shows an example of a "D"-shaped laser pump cavity.
Figure 2:
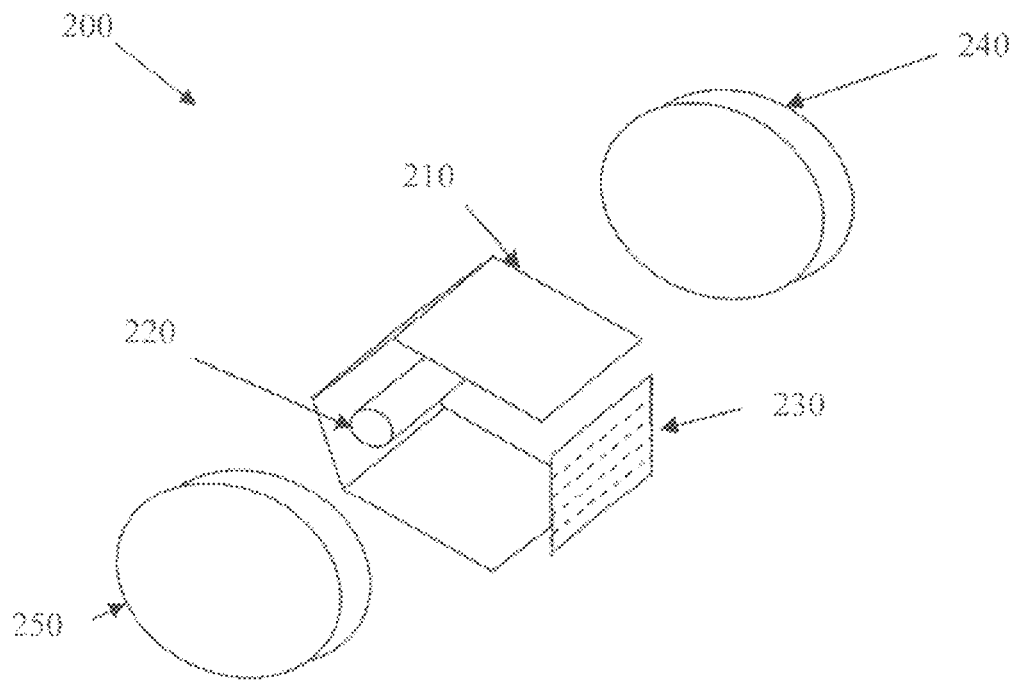
FIG. 2 shows a solid state V-type laser resonator in which a rod is placed in one of the pump cavities shown and the pump source is an array of diode bars.

A preferred embodiment of the present invention provides pump cavities for solid state lasers enabling easy and rapid change of pump source. Consider a solid state laser resonator in which the rod is placed in one or the other of the pump cavities shown in the FIG. 1a and FIG. 1b with the pump source as an array of diode bars in the base plane as shown in FIG. 2. By proper design of the mounting structure the array of diode bars shown can be snapped or screwed into position to pump the laser rod and just as easily removed without touching any of the laser resonator components.

FIG. 2 shows an example of a laser resonator though the same comments hold true for resonators with additional components such as Q-switches, polarizers, intracavity lenses, mode locking modulators, second harmonic generators, alignment wedges and the like. The configuration shown in FIG. 2 allows for rapid replacement of diode arrays when they may have failed which is a great improvement in all applications. The configuration also allows replacement of diode arrays with a central wavelength suited to one operating temperature with another better suited to a different operating temperature.

The invention can use turrets containing two or more diode arrays that rotate the selected array into proper position at the open end of the pump cavity while storing the other array(s) for later use or sliding trays of two or more diode arrays that slide the desired array into position while storing the other array(s) for later use. This type of configuration is very important in lasers used in the field where it may be difficult or dangerous to stop to change pump arrays but where changing operating temperatures may necessitate a change in pump diode array.

A tray to translate diode arrays could be a rectangular plate with more than one array affixed to it along with electrical connections to the arrays and cooling. The plate could be translated linearly to move the appropriate array into position. Alternatively, the arrays could be affixed to a round plate and rotated into position to pump the laser rod. In both cases the position can be fixed with a ratchet or other spring loaded type of device to stop the movement when the selection array is in the correct position. A turret could look something like a ferris wheel with the arrays affixed so that you rotate the turret to position the desired array in the opening or at the pump window of the pump cavity. Again the ratchet or spring loaded type of device could assure that the turret stopped in precisely the right place so the proper array could be used.

The reason for changing pump diode arrays with changing temperature is that the wavelength at which the diodes emit changes with temperature. Consequently, as the temperature changes a pump array that worked well at the original temperature may be very inefficient in exciting the laser rod at the new temperature. Thus, the user can select diode arrays that are prepared for operation at the current temperature as well as a different operational temperature. The change of pump arrays can be automated with a temperature sensor, circuitry and means to translate a tray or rotate a turret containing the set of diode arrays.

Figure 3:
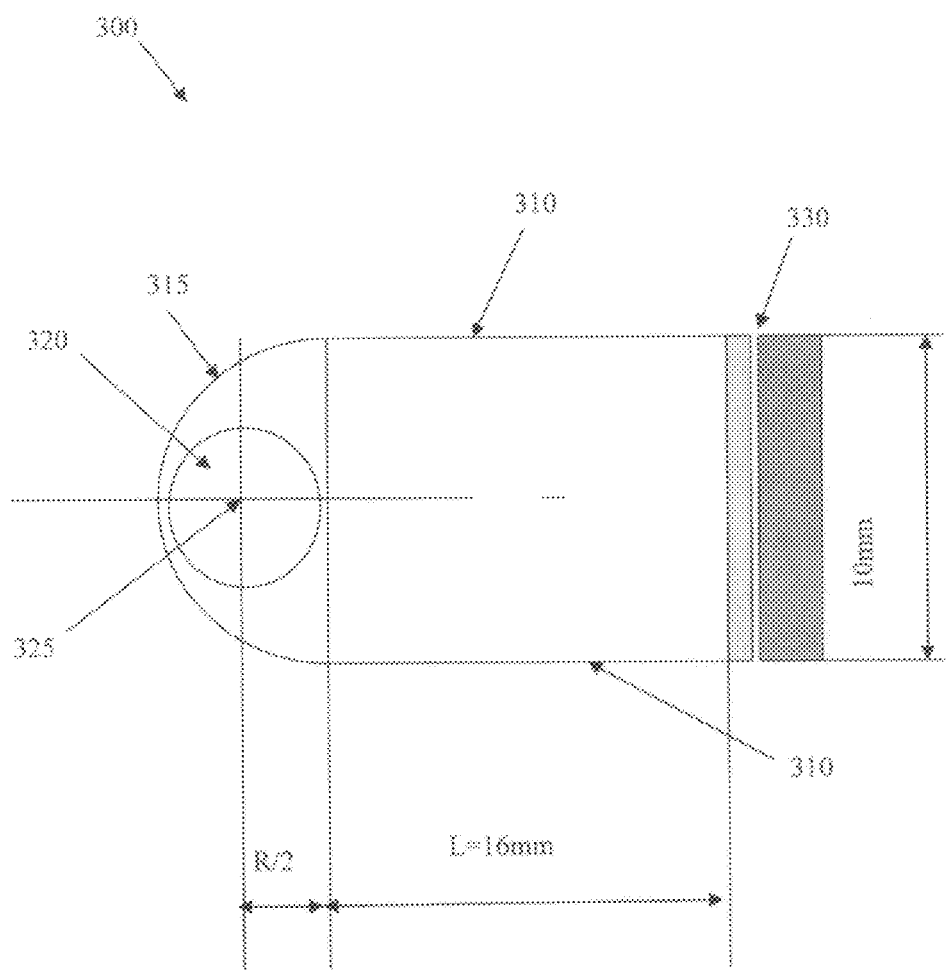
FIG. 3 shows a D-shaped pump cavity with rod center approximately at the focal point of the D curve according to an embodiment of the present invention.

The embodiment shown in FIG. 3 includes a roof top structure, shown as a D shaped cavity, such as has been used to pump laser rods for several decades. In previous incarnations of such a pump cavity the reflecting surfaces were either specular, which provided high pump efficiency but poor uniformity, or scattering, which provided good uniformity but low pump efficiency.

This embodiment of the present invention provides methods, devices and apparatus for a laser pump cavity for pumping laser rods with commercially available arrays of diode lasers or bars of diode lasers in which the side and end walls of the cavity are polished and coated to be highly specularly reflective while the inner surfaces of the D or roof top shaped pump cavities are highly reflective but light scattering surfaces. In this configuration, both high efficiency and uniformity of absorption of pump light can be achieved.

Figure 4:
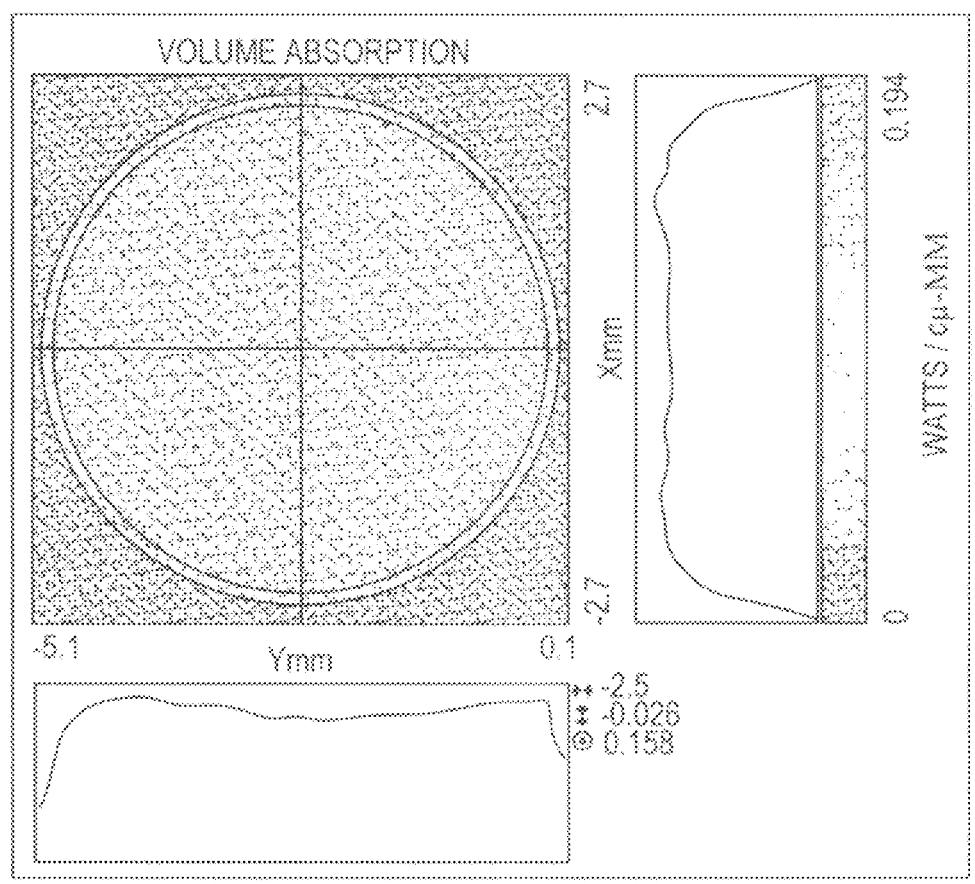
FIG. 4 the pump distribution in a 5 mm rod in a D-shaped cavity.

FIG. 3 shows a cross section of the D-type pump cavity structure 300 according to this embodiment of the invention with two side walls removed to show the shape of the inside of the pump cavity. The inside reflection surfaces in this example are scattering on the curved surface 315 of the D and specular on the straight side surfaces 310 and end plate. The end plate can be a window to allow pump light to enter the enclosed cavity and to confine a coolant within the cavity. The rod center is placed at the focal point 325 of the roof top, the D curve in this example, rather than at the center of curvature. The array in the experimental model had seven diode bars with 400 μm pitch between bars. The diode arrays can be formed by stacking several diode laser bars, each typically 1 cm wide, with appropriate spacers. The rod diameter was 5 mm and D radius was 5 mm. A fused quartz window was used to seal the pump cavity 300. It was placed 16 mm away from center of curvature of the curved surface 315. ASAP, a non sequential ray trace program by Breault Optical Company, was used to calculate the pump efficiency as 81%, assuming 85% reflection at the scattering curved surface, 99% reflection from the specular surfaces and 50% reflection at diode array surface. In the experiment, some pump light leaked out of the pump cavity from the gap between the diode structure 330 and the window. The resulting pump distribution is as shown as in FIG. 4, demonstrating that the D-type cavity 300 with mixed inner wall finishes can yield both high efficiency and uniformity.

This present invention applies to many other sorts of pump cavities, such as v-shaped or domed cavities for example, where a mixture of scattering and specular reflecting surfaces can result in both efficient and uniform absorption of pump light by the laser gain medium to be pumped.

An additional benefit of this roof-top type of pump cavity is the fact that it is very easy to replace pump arrays without interfering with the laser resonator alignment. This feature makes it possible to have more than one pump array available for the laser to be selected according to the operating conditions of the system. For example, one array may be optimized for ambient temperatures near −20 to −30° C. while another for higher temperature operation.

The invention would have applications in military lasers used in the field for designation and ranging. The invention would have further applications in commercial lasers where down time must be minimized.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of rapidly changing a pump source in a laser system, comprising the steps of:
   providing a pump cavity having a roof-top structure having a roof-top portion and an interior light scattering reflector surface, specular reflective side plates and a base opposite the top;
   positioning a laser rod within the roof-top portion of the roof-top structure between the specular reflective side plates within the pump cavity;
   providing a laser resonator output coupler and a laser resonator reflector for the laser rod; and
   pumping the laser rod with a first pump diode laser array with a wavelength spectrum optimized for pumping at a first operating temperature, wherein the first pump diode laser array is connected to a movable mounting structure to allow rapidly changing the first pump diode laser array with a second pump diode laser array without touching laser resonator components.

2. The method of claim 1 wherein the base is a window to couple pump light into the pump cavity.

3. The method of claim 2 further comprising the step of:
   sealing the pump cavity to confine coolant within the pump cavity to cool the laser rod.

4. The method of claim 1, further comprising the step of:
   replacing the first pump diode laser array with the second pump diode laser array having a wavelength spectrum optimized for a second operating temperature different than the first operating temperature.

5. The method of claim 4, further comprising the step of:
   rotating the second pump diode laser array from a turret movable mounting structure containing two or more different pump diode laser arrays into position to replace the first pump diode laser array.

6. The method of claim 4, further comprising the step of:
   sliding the second pump diode laser array from a slidable mounting structure containing two or more different pump diode laser arrays into position to replace the first pump diode laser array.

7. The method of claim 4, further comprising the step of:
   snapping the second pump diode laser array from a removable mounting structure containing two or more different pump diode laser arrays into position to replace the first pump diode laser array.

8. The method of claim 4, further comprising the step of:
   screwing the second pump diode laser array from a removable mounting structure into position to replace the first pump diode laser array.

9. A laser pump cavity comprising:
   a roof top structure having a roof-top portion with an interior light scattering reflector surface and specular reflector side walls extending from the roof-top portion to form the roof top structure with a base opposite the roof-top portion;
   a laser rod positioned within the roof-top portion of the roof top structure between the specular reflector side walls;
   a pump source removably connected with the base to pump the laser rod; and
   a movable mounting structure to selectively position one of two or more pump sources at the base of the roof top structure to pump the laser rod.

10. The laser pump cavity of claim 9 wherein the roof-top portion of the roof top structure is D-shaped and the laser rod is positioned at the focal point of the D curve of the D-shaped roof top structure.

11. The laser pump cavity of claim 9 wherein the pump source is a pump diode laser array to pump the laser rod.

12. The laser pump cavity of claim 9 wherein the movable mounting structure is a slidable base plate containing two or more pump sources to slide any one of the two or more pump sources into position to pump the laser rod while storing the other two or more pump sources.

13. The laser pump cavity of claim 9 wherein the movable mounting structure is a turret containing two or more pump sources to rotate any one of the two or more pump sources into position to pump the laser rod while storing the other two or more pump sources.

14. The laser pump cavity of claim 9 wherein the movable mounting structure is snapped into position to pump the laser rod.

15. The laser pump cavity of claim 9 wherein the movable mounting structure is screwed into position to pump the laser rod.

16. The laser pump cavity of claim 9 further comprising one or more of a Q-switch, a polarizer, an intracavity lens, a mode locking modulator, a second harmonic generator, and an alignment wedge.

17. The laser pump cavity of claim 9 further comprising:
   a laser resonator output coupler on one side of the roof top structure and a laser resonator reflector opposite the laser resonator output for the laser rod.

18. An interchangeable laser pump source system comprising:
   a pump cavity structure having a top portion and side walls extending from the top portion to form the pump cavity structure;
   a laser rod positioned within the top portion of the pump cavity structure between the side walls;
   a base plate opposite the top portion of the pump cavity structure; and
   two or more pump sources connected with a movable mounting structure and coupled to pump the laser rod, the mounting structure movable to allow changing of the pump source without touching other laser resonator components.

19. The laser pump cavity of claim 8 wherein the pump cavity structure is a roof top structure, the top portion of the pump cavity structure is D-shaped and the laser rod is positioned at the focal point of the D curve of the D-shaped roof top structure.

20. The laser pump cavity of claim 18 wherein the pump source is a pump diode laser array to pump the laser rod.

21. The laser pump cavity of claim 20 wherein the movable mounting structure is a slidable mounting structure containing two or more pump diode laser arrays to slide any one of the two or more pump diode laser array into position to pump the laser rod while storing the other two or more pump diode laser array.

22. The laser pump cavity of claim 21 wherein the movable mounting structure is a turret containing two or more pump diode laser array to rotate any one of the two or more pump diode laser array into position to pump the laser rod while storing the other two or more pump diode laser array.

23. The laser pump cavity of claim 18 wherein the movable mounting structure is snapped into position to pump the laser rod.

24. The laser pump cavity of claim 18 wherein the movable mounting structure is screwed into position to pump the laser rod.

25. The laser pump cavity of claim 18 further comprising one or more of a Q-switch, a polarizer, an intracavity lens, a mode locking modulator, a second harmonic generator, and an alignment wedge.

26. The laser pump cavity of claim 18 wherein the top portion has an interior scattering reflection surface and the side walls facing the laser rod are specular reflecting surfaces.

27. The laser pump cavity of claim 18 wherein the base plate has an interior specular reflecting surface.

28. The laser pump cavity of claim 18 further comprising:
a sensor coupled with the laser pump cavity to sense an environmental condition; and
a controller to change a position of the movable mounting structure to automatically change the pump source based on the sensed environmental condition.

\* \* \* \* \*